United States Patent
Butcher et al.

(10) Patent No.: US 10,112,596 B2
(45) Date of Patent: Oct. 30, 2018

(54) HYBRID VEHICLE OPERATING STRATEGY DURING LOSS OF MOTOR CONTROLLABILITY

(71) Applicant: FORD GLOBAL TECHNOLOGIES, LLC, Dearborn, MI (US)

(72) Inventors: Jonathan Andrew Butcher, Farmington Hills, MI (US); Walter Joseph Ortmann, Saline, MI (US); Francis Thomas Connolly, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 197 days.

(21) Appl. No.: 15/157,931

(22) Filed: May 18, 2016

(65) Prior Publication Data
US 2017/0334427 A1 Nov. 23, 2017

(51) Int. Cl.
*B60W 20/13* (2016.01)
*B60K 6/547* (2007.10)
(Continued)

(52) U.S. Cl.
CPC .............. *B60W 20/13* (2016.01); *B60K 6/48* (2013.01); *B60K 6/547* (2013.01); *B60W 10/06* (2013.01);
(Continued)

(58) Field of Classification Search
CPC ...... B60W 20/00; B60W 10/08; B60W 10/06; B60W 10/26; B60W 2510/244; B60W 10/02; B60W 10/30; B60W 20/40; B60W 20/10; B60W 2520/10; B60W 20/13; B60W 20/20; B60W 2510/0638; B60W 2540/10; B60K 6/48; B60K 6/46; B60K 6/52; B60K 6/38; Y02T 10/6221; Y02T 10/6286;
(Continued)

(56) References Cited

U.S. PATENT DOCUMENTS

| 5,635,805 A * | 6/1997 | Ibaraki | B60K 6/46 |
| | | | 180/65.245 |
| 6,307,276 B1 * | 10/2001 | Bader | B60K 6/48 |
| | | | 180/65.25 |

(Continued)

FOREIGN PATENT DOCUMENTS

GB 2545642 A * 6/2017 ...... B60W 30/18127

*Primary Examiner* — Anne M Antonucci
*Assistant Examiner* — Sanjeev Malhotra
(74) *Attorney, Agent, or Firm* — David Kelley; Brooks Kushman P.C.

(57) ABSTRACT

A vehicle includes a hybrid powertrain. The hybrid powertrain includes an engine and an electric machine. In response to a loss of controllability of the electric machine, a controller is programmed to operate the powertrain in a limited operating mode. In the limited operating mode, the powertrain is controlled so that a speed of the engine is within a speed range such that the electric machine generates a current to charge a traction battery. In response to a loss of communication with a power inverter that controls the electric machine, the powertrain is controlled so that the speed of the engine is within the speed range and the current flowing to the traction battery is monitored. If the current flow is above a threshold, then the limited operating mode is entered.

17 Claims, 3 Drawing Sheets

(51) Int. Cl.
*B60W 10/06* (2006.01)
*B60W 10/08* (2006.01)
*B60W 10/10* (2012.01)
*B60K 6/48* (2007.10)

(52) U.S. Cl.
CPC ............ *B60W 10/08* (2013.01); *B60W 10/10* (2013.01); *B60K 2006/4825* (2013.01); *B60W 2510/1005* (2013.01); *B60W 2510/244* (2013.01); *B60W 2710/081* (2013.01); *B60Y 2200/92* (2013.01); *B60Y 2300/182* (2013.01); *B60Y 2300/43* (2013.01); *B60Y 2300/60* (2013.01); *B60Y 2300/91* (2013.01); *Y10S 903/93* (2013.01)

(58) Field of Classification Search
CPC ............ Y02T 10/7077; Y02T 10/7005; Y02T 10/642; Y02T 10/645; Y02T 10/52; Y02T 10/6217; Y02T 10/6265; Y02T 10/70; Y02T 10/705; Y02T 10/7275; Y02T 10/7044; Y02T 10/7216; Y02T 90/16; B60L 11/14; B60L 2240/423; B60L 2240/441; B60L 2240/486; B60L 2240/421; B60L 11/123; B60L 3/0046; B60L 11/1861; B60L 1/003; B60L 2210/10; B60L 2240/443; B60L 2240/547; B60L 2240/549; Y10S 903/93
USPC ................ 701/22; 180/65.245, 65.25, 65.31; 74/11, 665 L; 477/5; 475/5
See application file for complete search history.

(56) References Cited

U.S. PATENT DOCUMENTS

| | | | |
|---|---|---|---|
| 8,020,650 B2 | 9/2011 | Van Maanen et al. | |
| 8,120,200 B2 | 2/2012 | Walters et al. | |
| 8,606,447 B2 | 12/2013 | Namuduri et al. | |
| 2010/0324768 A1* | 12/2010 | Besnard | B60W 10/02 701/22 |
| 2011/0192662 A1* | 8/2011 | Hennings | B60K 6/30 180/65.25 |
| 2012/0173063 A1* | 7/2012 | Madurai Kumar | B60K 6/48 701/22 |
| 2012/0211291 A1* | 8/2012 | Black | B60L 7/10 180/65.31 |
| 2012/0253575 A1* | 10/2012 | Le Brusq | B60K 6/48 701/22 |
| 2012/0285292 A1* | 11/2012 | Barnes | B60K 6/48 74/665 L |
| 2012/0302397 A1* | 11/2012 | Habbani | B60K 6/48 477/5 |
| 2013/0274984 A1* | 10/2013 | Justin | B60W 10/26 701/22 |
| 2015/0025720 A1 | 1/2015 | Bae et al. | |
| 2015/0158483 A1* | 6/2015 | Dalum | B60K 6/12 701/22 |
| 2015/0224866 A1* | 8/2015 | Parenti | B60K 6/387 475/5 |
| 2015/0267380 A1* | 9/2015 | Kaneko | B60K 6/46 701/22 |
| 2015/0283991 A1* | 10/2015 | Dalum | B60W 20/10 701/22 |
| 2015/0321657 A1* | 11/2015 | Lasson | B60L 1/003 701/22 |
| 2015/0354447 A1* | 12/2015 | Hemphill | B60K 6/38 74/11 |
| 2016/0001768 A1* | 1/2016 | Lennevi | B60L 3/0023 701/22 |
| 2016/0214490 A1* | 7/2016 | Soo | B60L 11/1861 |
| 2017/0335816 A1* | 11/2017 | Hao | B60L 11/1851 |
| 2017/0355365 A1* | 12/2017 | Le-Cam | B60W 20/19 |

* cited by examiner

HYBRID VEHICLE OPERATING STRATEGY DURING LOSS OF MOTOR CONTROLLABILITY

TECHNICAL FIELD

This application generally relates to a hybrid vehicle operating strategy during a loss of controllability of an electric propulsion unit.

BACKGROUND

A hybrid vehicle typically includes an engine and one or more electric machines that provide propulsion for the vehicle. In addition, the electric machines are used to charge a traction battery. Under various conditions, the electric machines may become inoperable. A typical response to such conditions is to prevent operation of the hybrid vehicle.

SUMMARY

A vehicle includes an engine and an electric machine coupled to a gearbox. The vehicle also includes a controller programmed to, for a period of time defined by a state of charge of a traction battery being less than a threshold in a presence of a loss of controllability of the electric machine, operate the engine and gearbox to cause current to flow from the electric machine to the traction battery.

A hybrid powertrain includes a controller programmed to. The hybrid powertrain also includes in response to a loss of communication with a power inverter that controls an electric machine for propulsion, adjust a speed of an engine to fall within a predetermined range. The hybrid powertrain also includes in response to a current flowing into a traction battery exceeding a threshold, transition the hybrid powertrain to a limited operating mode to maintain a state of charge of the traction battery above a predetermined level.

A method includes changing by a controller an engine speed and a transmission gear during a drive cycle, in response to detecting a loss of controllability of an electric machine and a state of charge of a traction battery being less than a predetermined threshold, such that the engine speed falls within a predetermined range to rotate the electric machine to cause current flow to the traction battery.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
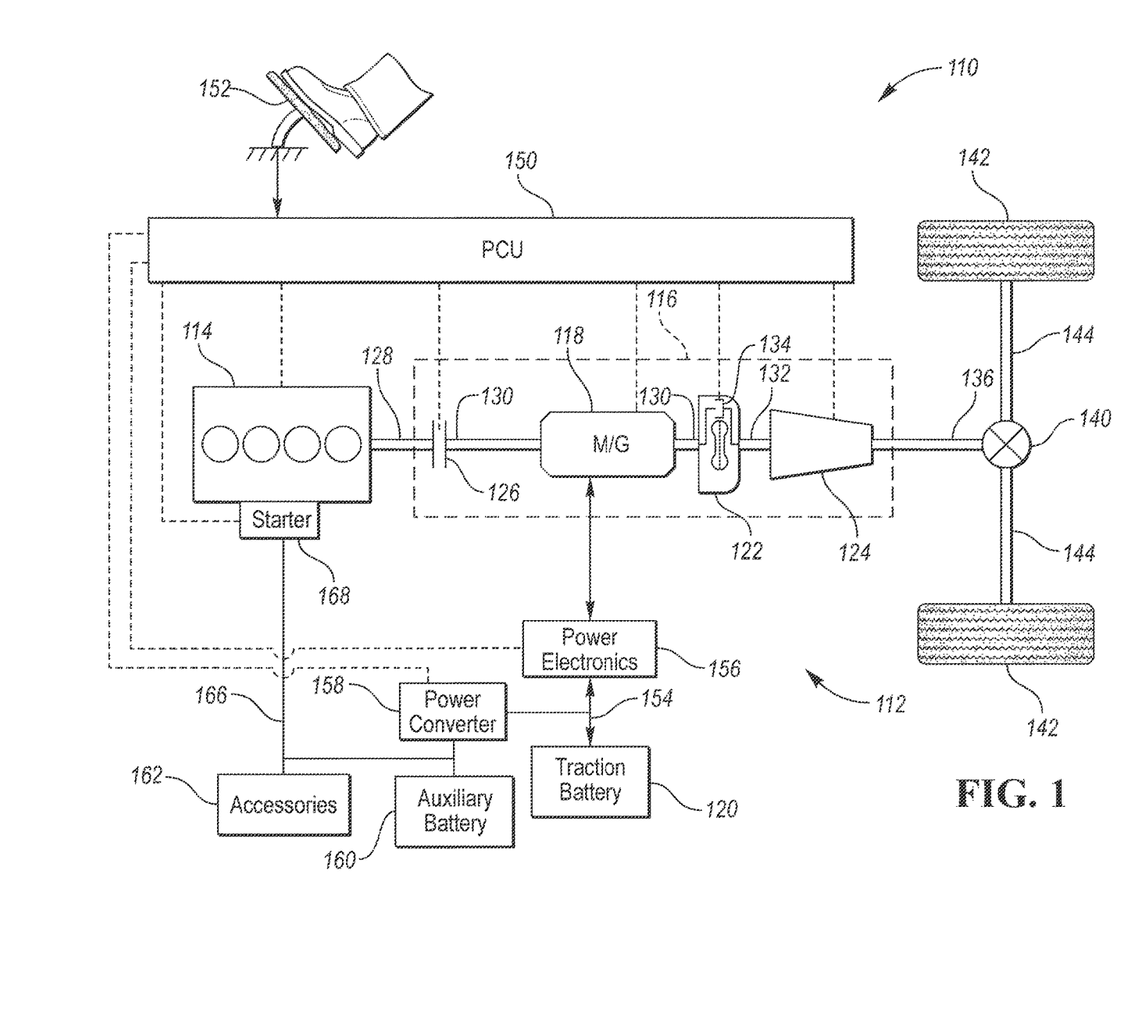
FIG. 1 is a block diagram of a vehicle with a hybrid powertrain.

Referring to FIG. 1, a schematic diagram of a hybrid electric vehicle (HEV) 110 is illustrated according to an embodiment of the present disclosure. FIG. 1 illustrates representative relationships among the components. Physical placement and orientation of the components within the vehicle may vary. The HEV 110 includes a powertrain 112. The powertrain 112 includes an engine 114 that drives a transmission 116, which may be referred to as a modular hybrid transmission (MHT). As will be described in further detail below, transmission 116 includes an electric machine such as an electric motor/generator (M/G) 118, an associated traction battery 120, a torque converter 122, and a multiple step-ratio automatic transmission, or gearbox 124.

The engine 114 and the M/G 118 are both drive sources for the HEV 110. The engine 114 generally represents a power source that may include an internal combustion engine such as a gasoline, diesel, or natural gas powered engine, or a fuel cell. The engine 114 generates an engine power and corresponding engine torque that is supplied to the M/G 118 when a disconnect clutch 126 between the engine 114 and the M/G 118 is at least partially engaged. The M/G 118 may be implemented by any one of a plurality of types of electric machines. For example, M/G 118 may be a permanent magnet synchronous motor. Power electronics 156 condition direct current (DC) power provided by the traction battery 120 to the requirements of the M/G 118, as will be described below. For example, power electronics may provide three phase alternating current (AC) to the M/G 118.

When the disconnect clutch 126 is at least partially engaged, power flow from the engine 114 to the M/G 118 or from the M/G 118 to the engine 114 is possible. For example, the disconnect clutch 126 may be engaged and M/G 118 may operate as a generator to convert rotational energy provided by a crankshaft 128 and M/G shaft 130 into electrical energy to be stored in the traction battery 120. The disconnect clutch 126 can also be disengaged to isolate the engine 114 from the remainder of the powertrain 112 such that the M/G 118 can act as the sole drive source for the HEV 110. Shaft 130 extends through the M/G 118. The M/G 118 is continuously drivably connected to the shaft 130, whereas the engine 114 is drivably connected to the shaft 130 only when the disconnect clutch 126 is at least partially engaged.

The M/G 118 is connected to the torque converter 122 via shaft 130. The torque converter 122 is therefore connected to the engine 114 when the disconnect clutch 126 is at least partially engaged. The torque converter 122 includes an impeller fixed to M/G shaft 130 and a turbine fixed to a transmission input shaft 132. The torque converter 122 thus provides a hydraulic coupling between shaft 130 and transmission input shaft 132. The torque converter 122 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 134 may also be provided that, when engaged, frictionally or mechanically couples the impeller and the turbine of the torque converter 122, permitting more efficient power transfer. The torque converter bypass clutch 134 may be operated as a launch clutch to provide smooth vehicle launch. Alternatively, or in combination, a launch clutch similar to disconnect clutch 126 may be provided between the M/G 118 and gearbox 124 for applications that do not include a torque converter 122 or a torque converter bypass clutch 134. In some applications, disconnect clutch 126 is generally referred to as an upstream clutch and launch clutch 134 (which may be a torque converter bypass clutch) is generally referred to as a downstream clutch.

The gearbox 124 may include gear sets (not shown) that are selectively placed in different gear ratios by selective engagement of friction elements such as clutches and brakes (not shown) to establish the desired multiple discrete or step drive ratios. The gearbox 124 may provide a predetermined number of gear ratios that may range from a low gear (e.g., first gear) to a highest gear (e.g., Nth gear). An upshift of the gearbox 124 is a transition to a higher gear. A downshift of the gearbox 124 is a transition to a lower gear. The friction elements are controllable through a shift schedule that connects and disconnects certain elements of the gear sets to control the ratio between a transmission output shaft 136 and the transmission input shaft 132. The gearbox 124 is automatically shifted from one ratio to another based on various vehicle and ambient operating conditions by an associated controller, such as a powertrain control unit (PCU) 150. The gearbox 124 then provides powertrain output torque to output shaft 136.

It should be understood that the hydraulically controlled gearbox 124 used with a torque converter 122 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 124 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 136 is connected to a differential 140. The differential 140 drives a pair of wheels 142 via respective axles 144 connected to the differential 140. The differential 140 transmits approximately equal torque to each wheel 142 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 112 further includes an associated powertrain control unit (PCU) 150. While illustrated as one controller, the PCU 150 may be part of a larger control system and may be controlled by various other controllers throughout the vehicle 110, such as a vehicle system controller (VSC). It should therefore be understood that the powertrain control unit 150 and one or more other controllers can collectively be referred to as a "controller" that controls various actuators in response to signals from various sensors to control functions such as starting/stopping engine 114, operating M/G 118 to provide wheel torque or charge traction battery 120, select or schedule transmission shifts, etc. Controller 150 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 150 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 150 may communicate signals to and/or from engine 114, disconnect clutch 126, M/G 118, launch clutch 134, transmission gearbox 124, and power electronics 156. Although not explicitly illustrated, those of ordinary skill in the art will recognize various functions or components that may be controlled by PCU 150 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 126, launch clutch 134, and transmission gearbox 124, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 134 status (TCC), deceleration or shift mode (MDE), for example.

Control logic or functions performed by PCU 150 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 150. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 152 is used by the driver of the vehicle to provide a demanded torque, power, or drive command to propel the vehicle 110. In general, depressing and releasing the accelerator pedal 152 generates an accelerator pedal position signal that may be interpreted by the controller 150 as a demand for increased power or decreased power, respectively. Based at least upon input from the pedal, the controller 150 commands torque from the engine 114 and/or the M/G 118. The controller 150 also controls the timing of gear shifts within the gearbox 124, as well as engagement or disengagement of the disconnect clutch 126 and the torque converter bypass clutch 134. Like the disconnect clutch 126, the torque converter bypass clutch 134 can be modulated across a range between the engaged and disengaged positions. This produces a variable slip in the torque converter 122 in addition to the variable slip produced by the hydrodynamic coupling between the impeller and the turbine. Alternatively, the torque converter bypass clutch 134 may be operated as locked or open without using a modulated operating mode depending on the particular application.

To drive the vehicle 110 with the engine 114, the disconnect clutch 126 is at least partially engaged to transfer at least a portion of the engine torque through the disconnect clutch 126 to the M/G 118, and then from the M/G 118 through the torque converter 122 and gearbox 124. The M/G 118 may assist the engine 114 by providing additional power to turn the shaft 130. This operation mode may be referred to as a "hybrid mode" or an "electric assist mode."

To drive the vehicle 110 with the M/G 118 as the sole power source, the power flow remains the same except the disconnect clutch 126 isolates the engine 114 from the remainder of the powertrain 112. Combustion in the engine 114 may be disabled or otherwise OFF during this time to conserve fuel. The traction battery 120 transmits stored electrical energy through a high-voltage (HV) bus 154 to power electronics 156 that may include an inverter, for example. The high-voltage bus 154 includes wiring and conductors for conducting current between modules and may include a positive-side conductor and a negative- or return-side conductor. The power electronics 156 convert DC voltage from the traction battery 120 into AC voltage to be used by the M/G 118. The PCU 150 commands the power electronics 156 to convert voltage from the traction battery 120 to an AC voltage provided to the M/G 118 to provide positive or negative torque to the shaft 130. This operation mode may be referred to as an "electric only" operation mode.

In any mode of operation, the M/G 118 may act as a motor and provide a driving force for the powertrain 112. Alternatively, the M/G 118 may act as a generator and convert kinetic energy from the powertrain 112 into electric energy to be stored in the traction battery 120. The M/G 118 may act as a generator while the engine 114 is providing propulsion power for the vehicle 110, for example. The M/G 118 may additionally act as a generator during times of regenerative braking in which rotational energy from spinning wheels 142 is transferred back through the gearbox 124 and is converted into electrical energy for storage in the traction battery 120.

It should be understood that the schematic illustrated in FIG. 1 is merely exemplary and is not intended to be limiting. Other configurations are contemplated that utilize selective engagement of both an engine and a motor to transmit torque through the transmission. For example, the M/G 118 may be offset from the crankshaft 128, an additional motor may be provided to start the engine 114, and/or the M/G 118 may be provided between the torque converter 122 and the gearbox 124. Other configurations are contemplated without deviating from the scope of the present disclosure.

The vehicle 110 may utilize the M/G 118 to start the engine 114. The PCU 150 may command the disconnect clutch 126 to close and request torque from the M/G 118 via the power electronics 156. The torque from the M/G 118 rotates the engine 114 so that the engine speed increases above a predetermined speed at which time the engine 114 may be commanded to provide fuel and spark to maintain continued engine rotation. The torque converter 122 may provide some torsional isolation during engine cranking and initial startup. In some vehicle configurations, a low-voltage starter motor 168 may also be coupled to the engine 114 to provide a secondary or backup means of starting the engine 114.

The vehicle 110 may further include a power converter module 158 and an auxiliary battery 160. The auxiliary battery 160 may be a low-voltage battery such as a 12 Volt battery that is commonly used in automobiles. Terminals of the auxiliary battery 160 may be electrically coupled to a low-voltage bus 166. The low-voltage bus 166 includes wiring and conductors for conducting current between connected modules. The power converter 158 may be electrically coupled between the high-voltage bus 154 and the low-voltage bus 166. The power converter module 158 may be a DC/DC converter that is configured to convert voltage from the high-voltage bus 154 to a voltage level compatible with the low-voltage bus 166. The power converter 158 may be further configured to convert voltage from the low-voltage bus 166 to voltage compatible with the high-voltage bus 154. For example, the power converter 158 may be configured to provide a two-way flow of current between the high-voltage bus 154 and the low-voltage bus 166.

The M/G 118 may be a permanent magnet (PM) electric machine. A PM electric machine includes a rotor and a stator. The stator may include windings for producing a magnetic field to rotate the rotor. Current through the stator windings may be controlled to vary the magnetic field acting on the rotor. The rotor of a PM machine includes permanent magnets that create a magnetic field that interacts with the stator magnetic field to cause rotation of the rotor. The rotor speed may be controlled by the frequency of the magnetic field created by the stator. Since the rotor of the PM machine has magnets, rotating the rotor causes a magnetic field that interacts with the stator windings. The result is a voltage or back electromotive force (EMF) in the stator circuit. The magnitude of the back-EMF increases with the rotational speed of the rotor.

The PM machine may be a three-phase machine. The three-phase PM machine may include three phase terminals that are coupled to the stator windings. Each phase terminal is coupled to a different set of stator windings. By controlling the current and voltage applied to each of the terminals, the stator magnetic field may be controlled. The phases may be controlled so that a phase angle difference of the voltages between each of the phases is 120 degrees.

Figure 2:
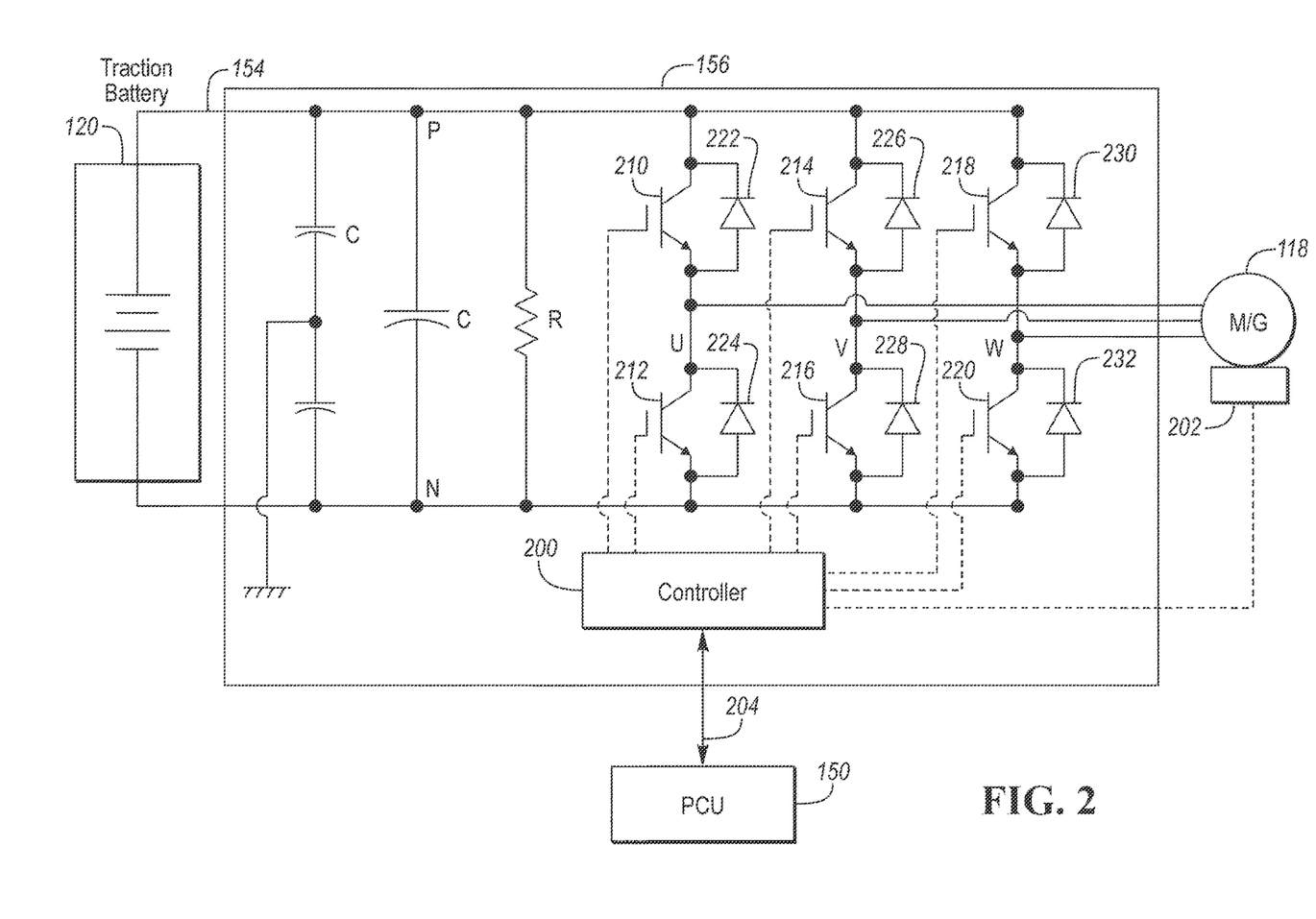
FIG. 2 depicts a possible configuration for power electronics in a hybrid powertrain.

FIG. 2 depicts a possible configuration for the power electronics module 156. The power electronics module 156 may be configured to switch positive and negative terminals of the high-voltage bus 154 to phase terminals of the M/G 118.

The power electronics 156 may interface with a position or speed feedback device 202 that is coupled to the rotor of the M/G 118. For example, the speed feedback device 202 may be a resolver or an encoder. The speed feedback device 202 may provide signals indicative of a position and/or speed of the rotor of the M/G 118. The power electronics 156 may include a power electronics controller 200 that interfaces with the speed feedback device 202 and processes signals from the speed feedback device 202. The power electronics controller 200 may be programmed to utilize the speed and position feedback to control operation of the M/G 118.

A hybrid powertrain utilizing a single electric machine for propulsion and battery charging may be vulnerable to inoperable components. It is desired to maintain operation of the M/G 118 under as many conditions as possible. The M/G 118 of the hybrid powertrain functions as the sole generator of electrical power for the vehicle 110. Any loss of operability of the M/G 118 will cause the traction battery 120 to be drained. The traction battery 120 provides power for the low-voltage bus 166 via the power converter 158 so the auxiliary battery 160 may be drained as well. When the state of charge of the traction battery 120 or the auxiliary battery 160 falls below an associated threshold, vehicle operation may not be possible. At or near the associated thresholds, an orderly shutdown may be initiated as vehicle functions may no longer be provided. An improved mode of operation may be to implement a limited operating strategy (LOS) designed to maintain the state of charge of the batteries utilizing operating characteristics inherent to the M/G 118.

The power electronic controller 200 may be programmed to diagnose operability of the power electronics 156. For example, the power electronics controller 200 may be programmed to diagnose issues related to the speed feedback device 202. A variety of conditions may cause the speed feedback device 202 to become inoperable. For example, severed or intermittently connected wires between the power electronics controller 200 and the speed feedback device 202 may cause a loss of signal. In some cases, wires may become shorted to other conductors leading to a loss of reliable signal. In addition, mechanical issues with the speed feedback device 202 may cause a loss of signal. Other sensors, such as voltage and current sensors, and actuators, such as switching devices, may be monitored for proper operation.

The power electronics controller 200 may also be configured to communicate with other vehicle controllers (e.g., PCU 150) via a communication network 204. For example, the PCU 150 and the power electronics controller 200 may communicate with one another through the vehicle communication network 204. Data and status information related to the speed feedback device 202 may be communicated over the communication network 204 to other controllers for powertrain control and coordination. The controllers attached to the network 204 may monitor the communication network 204 for communication errors. Controllers attached to the network 204 may be programmed to transmit messages at predetermined time intervals. Controllers may monitor a time interval between receiving consecutive messages on the communication network 204. If the time interval exceeds a predetermined threshold, a loss of communication may be detected for the transmitting controller. For example, the power electronics controller 200 may be programmed to send a speed feedback message at periodic intervals to the PCU 150. The PCU 150 may monitor the time interval between receiving consecutive speed feedback messages. If the time interval between speed feedback messages exceeds a predetermined time, a loss of communication condition may be detected by the PCU 150.

The power electronics 156 may include a plurality of switching devices 210, 212, 214, 216, 218, 220. The switching devices may be Insulated Gate Bipolar junction Transistors (IGBTs) or other solid-state switching devices. The switching devices may be configured to selectively couple a positive terminal and a negative terminal of the high-voltage bus 154 to each phase terminal or leg (e.g., labeled U, V, W) of the M/G 118. Each of the switching devices may have an associated diode 222, 224, 226, 228 230, 232 connected in parallel to provide a path for inductive current when the switching device is in a non-conducting state. Each of the switching devices 210, 212, 214, 216, 218, 220 may have a control terminal for controlling operation of the associated switching device. The control terminals may be electrically coupled to the power electronics controller 200. The power electronics controller 200 may include associated circuitry to drive and monitor the control terminals.

A first switching device 210 may selectively couple the HV-bus positive terminal to a first phase terminal (e.g., U) of the M/G 118. A first diode 222 may be coupled in parallel to the first switching device 210. A second switching device 212 may selectively couple the HV-bus negative terminal to the first phase terminal (e.g., U) of the M/G 118. A second diode 224 may be coupled in parallel to the second switching device 212. A third switching device 214 may selectively couple the HV-bus positive terminal to a second phase terminal (e.g., V) of the M/G 118. A third diode 226 may be coupled in parallel to the third switching device 214. A fourth switching device 216 may selectively couple the HV-bus negative terminal to the second phase terminal (e.g., V) of the M/G 118. A fourth diode 228 may be coupled in parallel to the fourth switching device 216. A fifth switching device 218 may selectively couple the HV-bus positive terminal to a third phase terminal (e.g., W) of the M/G 118. A fifth diode 230 may be coupled in parallel to the fifth switching device 218. A sixth switching device 220 may selectively couple the HV-bus negative terminal to the third phase terminal (e.g., W) of the M/G 118. A sixth diode 232 may be coupled in parallel to the sixth switching device 220.

The power electronics controller 200 may be programmed to operate the switching devices 210, 212, 214, 216, 218, 220 to control the voltage and current applied to the M/G 118. The power electronics controller 200 may operate the switching devices 210, 212, 214, 216, 218, 220 so that each phase terminal is coupled to only one of the HV-bus positive terminal or the HV-bus negative terminal at a particular time. Various motor control algorithms and strategies are available to be implemented in the power electronics controller 200. The power electronics 156 may also include current sensors and voltage sensors. Current sensors may be inductive or Hall-effect devices configured to generate a signal indicative of the current passing through the associated circuit. Voltage sensors may be resistive networks and include isolation to separate high voltages from the low-voltage system.

Under normal operating conditions, the power electronics controller 200 controls operation of the M/G 118. For example, in response to torque and/or speed setpoints, the power electronics controller 200 may operate the switching devices 210, 212, 214, 216, 218, 220 to control the torque and speed of the M/G 118 to achieve the setpoints. The torque and/or speed setpoints may be processed to generate a desired switching pattern for the switching devices 210, 212, 214, 216, 218, 220. The control terminals of the switching devices 210, 212, 214, 216, 218, 220 may be driven with Pulse Width Modulated (PWM) signals to control the torque and speed of the M/G 118. The power electronics controller 200 may implement various well-known control strategies to control the M/G 118 using the switching devices such as vector control and six-step control. During normal operating conditions, the switching devices 210, 212, 214, 216, 218, 220 are actively controlled to achieve a desired current through each phase of the M/G 118.

Under unusual operating conditions, the power electronics controller 200 may experience a loss of ability to control the M/G 118. One possible response to conditions in which the M/G 118 cannot be operated or controlled in a reliable manner is to stop operating the switching devices 210, 212, 214, 216, 218, 220. For example, the power electronics controller 200 may cease activating the switching devices 210, 212, 214, 216, 218, 220 to prevent providing power to the M/G 118. In this condition, the switching devices 210, 212, 214, 216, 218, 220 are in a non-conducting state. Under these conditions, the M/G 118 is unable to be used for propulsion. However, the vehicle 110 may still be operated using the engine 114. In such a situation, the M/G 118 may continue to rotate powered by the engine 114.

Under certain conditions, the power electronics controller 200 may continue operate the M/G 118 in a limited operation mode. For example, in the event of certain conditions, the M/G 118 may be operated in an open-loop mode. The open-loop mode may provide minimal functionality and may allow for limited operation of the M/G 118. The open-loop mode may operate the switching devices 210, 212, 214, 216, 218, 220 to provide a current of a predetermined magnitude at a predetermined frequency based on a desired speed setpoint. The ability to operate in this limited mode may depend upon the condition that caused the loss of controllability. For example, a loss of communication between the PCU 150 and the power electronics controller 200 may cause operation in the limited operation mode. During a loss of communication, the power electronics controller 200 may not receive updated torque and/or speed setpoints. The power electronics controller 200 may operate for a limited period of time after the loss of communication using the last received setpoint. After the period of time, the power electronics controller 200 may operation with a zero torque setpoint. The power electronics controller 200 may operate the switching devices 210, 212, 214, 216, 218, 220 such that no torque is applied to the M/G 118.

In response to a loss of speed and position feedback, the power electronics controller 200 may be programmed to switch off the switching devices 210, 212, 214, 216, 218, 220 into a non-conducting state. During a loss of speed feedback, control of the M/G 118 may be compromised as the speed of the rotor is no longer known accurately. Attempting to operate the switching devices 210, 212, 214, 216, 218, 220 may cause undesirable operation of the M/G 118.

A characteristic of a PM machine is that when rotated it will induce a voltage in the stator. As the rotational speed increases, the induced voltage increases. The diodes 222, 224, 226, 228 230, 232 may act as a rectifier network when the switching devices are in the non-conducting state. If the induced voltage increases to a level above a voltage of the HV-bus positive terminal, the diodes 222, 224, 226, 228 230, 232 may conduct current to the HV-bus. In a state of operation in which the switching devices 210, 212, 214, 216, 218, 220 are maintained in the non-conducting state, the current supplied to the HV bus 154 is not controlled by the power electronics module 156. To prevent an overvoltage or overcurrent condition on the HV bus 154 it may be beneficial to control the speed of the M/G 118.

This self-generating characteristic may be used to provide a limp-home mode of operation under certain conditions. While the switching devices 210, 212, 214, 216, 218, 220 may not be operated to provide propulsion with the M/G 118, the engine 114 may still be coupled to the drive wheels 142. The traction battery 120 may be providing power to accessory loads 162 on the low-voltage bus 166 via the power converter 158. Because of this, the traction battery 120 may become depleted as the M/G 118 is not operated for recharging. However, it is possible to utilize the M/G 118 and power electronics 156 to recharge the traction battery 120 without actively controlling the switching devices 210, 212, 214, 216, 218, 220. The PCU 150 may operate the engine 114 and gearbox 124 to keep the M/G 118 operating at a speed that charges the traction battery 120.

In addition, accessories 162 may be controlled to reduce the amount of power consumed. Non-essential, non-safety related power loads may be disabled in the LOS mode. For example, heated seats may be disabled in the LOS mode. Other accessories may be operated in a limited mode. For example, cabin heating and/or cooling strategies may be altered to limit the amount of power needed.

The powertrain 112 may be operated in the limited operating strategy mode when the power electronics 156 cannot effectively control the M/G 118. The LOS mode may allow the vehicle 110 to reach a safe destination and prevent the vehicle 110 from immediately shutting down. This provides a limp-home mode that may allow limited-range operation of the vehicle.

Figure 3:
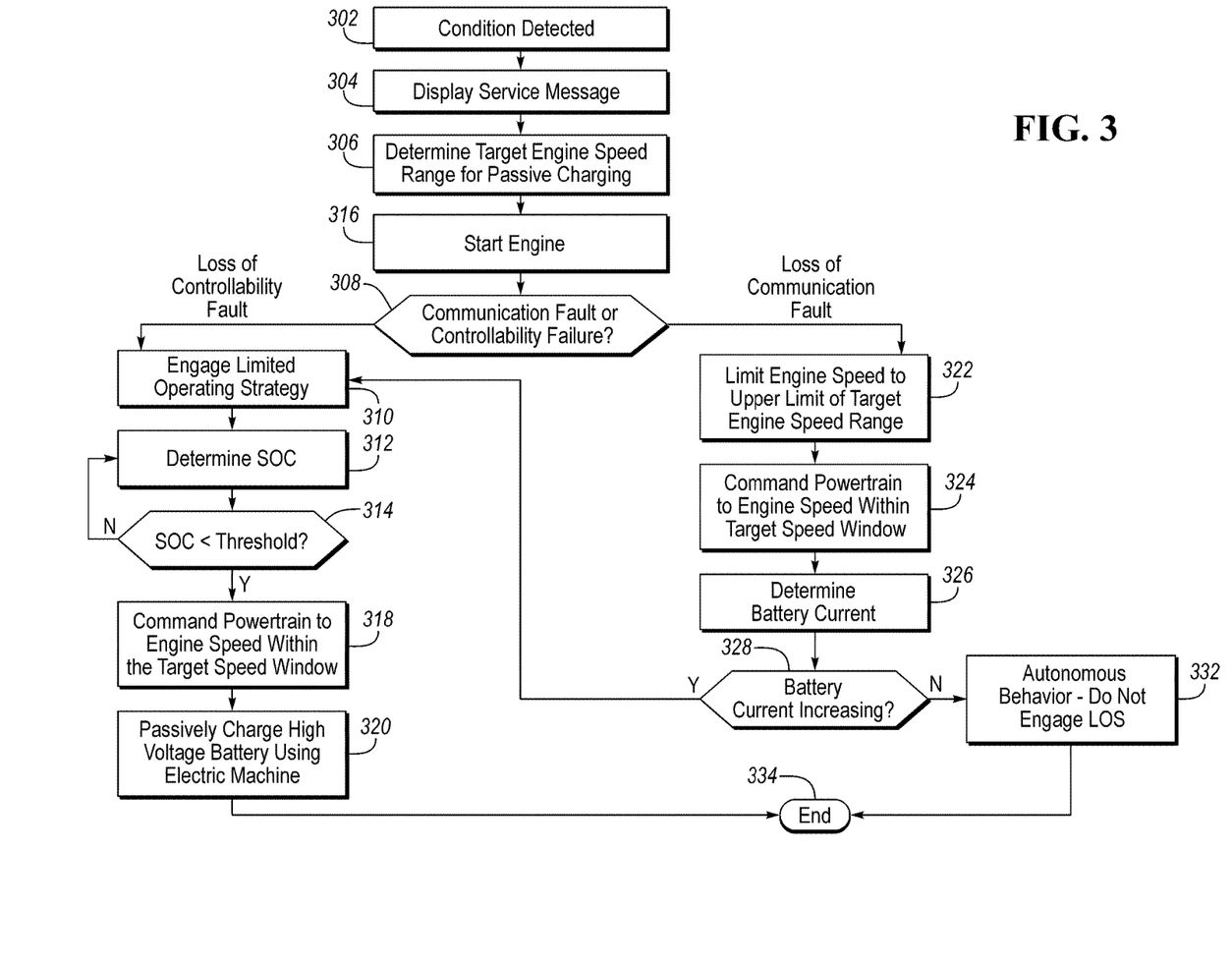
FIG. 3 is a flowchart of a possible sequence of operations for a vehicle powertrain system.

FIG. 3 depicts a flow chart for a possible sequence of operations for operating the vehicle. At operation 302 a diagnostic condition related to the power electronics 156 may be detected. The diagnostic condition may be indicative of a loss of controllability of the M/G 118 by the power electronics 156. For example, a loss of speed feedback may generate a diagnostic condition that results in the power electronics controller 200 being in a mode in which the switching devices are no longer activated. The loss of controllability condition covers any condition within the power electronics 156 or speed feedback device 202 that causes the switching devices 210, 212, 214, 216, 218, 220 to be placed in the non-conducting state. For example, other conditions that may cause a loss of controllability may be an inoperable microprocessor, memory and/or circuit within the power electronics controller 200. The diagnostic condition may include any condition that causes a loss of controllability of the M/G 118. The diagnostic condition may include detection of a loss of communication with the power electronics controller 200. The loss of controllability condition does not include any condition in which electrical pathways from the motor through the power electronics to the HV-bus are severed or compromised. The described limited operating strategy depends on the electrical pathways for power generation being intact.

At operation 304, a service message may be displayed in response to detection of the diagnostic condition. The vehicle 110 may include a display panel or instrument cluster that may provide an indication to the operator that the diagnostic condition is present and that the vehicle 110 needs attention. For example, a service vehicle soon lamp may be illuminated for the remainder of the ignition cycle. A record of the diagnostic condition may be stored in non-volatile memory of the PCU 150 for later retrieval.

At operation 306, a target engine speed for passive charging may be determined. The target engine speed may be a function of a selected gear of the gearbox 124, a state of charge of the traction battery 120, and/or a voltage level of the HV-bus 154. The target engine speed may further be a function of the vehicle speed. A target engine speed range may be computed that provides a window or range of engine speeds that can achieve the objective of providing current on the HV-bus 154. An upper limit of the target engine speed range may be defined as the engine speed at which a predetermined maximum amount of current is generated. The predetermined maximum amount of current may be a traction battery charge current limit. A lower limit of the target engine speed range may be defined as the engine speed at which a predetermined minimum amount of current is generated.

When disconnect clutch 126 is engaged, the speed of the M/G 118 is proportional to the speed of the engine 114. Magnetic and electrical properties of the M/G 118 may be known based on testing and analysis of the M/G 118. For example, a relationship between a generated voltage and rotational speed of the M/G 118 may be known. The relationship may be a function of the magnetic strength of the magnets of the M/G 118. The relationship may also be a function of the number of and layout of the stator windings. The speed of the M/G 118 may be used to compute a corresponding engine speed. This relationship may be implemented as a look-up table stored in controller non-volatile memory. The HV-bus voltage and/or traction battery voltage may be measured by a controller. The traction battery voltage may be used to determine the voltage output of the M/G 118 for charging the traction battery 120. Knowing the desired voltage output of the M/G 118, the engine speed that rotates the M/G 118 to cause the desired voltage output may be determined from the stored relationship.

The maximum engine target speed may be a function of the traction battery voltage, traction battery charge capability, traction battery resistance and the magnetic strength of the M/G 118. The traction battery charge capability may be defined as a maximum amount of power with which the traction battery can be charged. Further, the maximum engine target speed may be selected to prevent overvoltage and/or overcurrent of the HV-bus 154. The minimum engine target speed may be a function of the traction battery voltage and the magnetic strength of the M/G 118.

For example, the present voltage of the traction battery may be 300 Volts. The current battery charge power limit may be 35 kilowatts. The electric machine magnetic strength, which may be expressed as a ratio between a generated voltage and motor rotational speed, maybe 100 millivolts/RPM (revolutions per minute). In this example, the minimum engine/motor speed to affect battery charging would be 300V/(0.1V/RPM) or 3000 RPM. At this speed, battery charging is zero.

A maximum engine/motor speed may be calculated using the battery charge power capability and battery resistance estimate. For example, the battery resistance may be estimated to be 0.2 ohms. The maximum charge current to be applied may be computed as 35 kW/300V or 116.7 Amps. The voltage drop across the battery resistance may be computed as the product of the maximum charge current and the battery resistance, which is 23 Volts in this example. Therefore, the output of the electric machine may be 323 Volts. This may be converted to an equivalent engine/motor speed by dividing by the voltage/speed ratio and would yield 3230 RPM. For this example configuration, the predetermined target engine speed range may be between 3000 RPM and 3230RPM.

During vehicle operation, the target speed range may be adjusted as the various parameters may change during vehicle operation. The target speed range may be computed as described in real-time.

At operation 316, the engine 114 may be started if it is not already running and propulsion or traction battery charging is needed. The engine 114 may be started if a state of charge of the traction battery 120 is below a predetermined threshold. The engine 114 may be started is a driver propulsion demand determined from the accelerator pedal 152 is above a threshold demand level. As the M/G 118 is presently incapable of being controlled, the PCU 150 may command the low-voltage starter 168 to crank the engine 114. During engine cranking, the disconnect clutch 126 may be disengaged. Once the engine 114 is running, the disconnect clutch 126 may be engaged to spin the M/G 118 and provide torque to the gearbox 124. When the traction battery state of charge is above the threshold, engine start/stop features may remain active to improve fuel economy.

At operation 308, a check may be performed to determine the type of diagnostic condition that is present. A communication fault is a loss of communication over the vehicle network 204 between the PCU 150 and the power electronics controller 200. During a communication fault, the power electronics controller 200 may continue to operate the switching devices. For example, the switching devices may be operated to maintain a previous level of torque or ensure that zero torque is output from the M/G 118. Since there is no communication between the controllers, the vehicle controller 150 may not be able to confirm the operational mode of the power electronics 156. However, additional observation of the system behavior may confirm the operational mode. In response to detecting a loss of communication condition, the controller 150 may perform a sequence of operations to confirm the operation mode of the power electronics 156 (e.g., operations 322-332).

At operation 322, the PCU 150 may operate the engine 114 such that the engine speed is less than the upper limit of the target engine speed range. For example, if the engine speed is presently operating above the upper limit, the engine 114 may be controlled to reduce the engine speed. Further, the PCU 150 may command the gearbox 124 to switch to a selected gear to facilitate maintaining the engine speed below the target engine speed upper limit. As the operational state of the power electronics 156 may not be fully known, clipping or limiting the engine speed to the upper limit prevents an excessive current from being generated by the M/G 118.

At operation 324 the PCU 150 may command the engine 114 to operate at an engine speed that is within the target engine speed range. If the engine 114 was not already operating at an engine speed within the target engine speed range, the engine 114 may be commanded to operate at the commanded engine speed. Further, the PCU 150 may command the gearbox 124 to shift to another gear to achieve the target engine speed. For example, based on the present vehicle speed, the present gear may not be able to achieve the target engine speed range. The PCU 150 may determine a gear that permits the engine to operate within the target engine speed range at the present vehicle speed. For example, the gearbox 124 may be downshifted to permit the engine speed to be increased for a present vehicle speed.

At operation 326, the battery current is measured or estimated. At operation 328, the battery current is checked to determine if the battery current is increasing from a level prior to setting the engine speed within the target engine speed range. At the commanded engine speed that is within the target engine speed range, it is expected that the M/G 118 should be providing current to the HV-bus 154. The current flowing to the traction battery 120 may be measured to determine if the M/G 118 is operating as a generator. If the battery current has not increased, operation 332 is performed. At operation 332, the PCU 150 may assume autonomous behavior of the power electronics 156. That is, the power electronics controller 200 is in control of the power electronics 156 and operating the switching devices. In this situation, operating in the LOS mode is prevented.

If the battery current is increasing, a loss of controllability of the M/G 118 may be confirmed and the sequence of operations starting with operation 310 may be performed. At operation 310, the LOS mode may be initiated. In the LOS mode, the powertrain 112 may be operated to maintain the M/G 118 within the target engine speed range.

In response to detecting that a loss of controllability of the M/G 118 at operation 308, the controller 150 may perform a sequence of operations to implement the LOS (e.g., operations 310-320). That is, the M/G 118 may be operated at a speed such that the traction battery 120 is recharged.

At operation 312, the state of charge (SOC) of the traction battery 120 may be determined. The SOC may be received from a traction battery controller. At operation 314, the SOC may be compared to a threshold SOC. In general, the PCU 150 may attempt to prevent the SOC from falling below a predetermined minimum threshold. If the SOC is greater than or equal to the threshold, there may be no immediate need to operate the engine 114 within the target engine speed range to charge the traction battery 120. The selection of the engine speed and gearbox gear may be based on the vehicle speed and operation of the accelerator pedal 152. In this non-charging mode, the engine speed may be outside of the target engine speed range of the LOS mode. If the SOC is below the threshold, then operation 318 may be performed to operate the powertrain for charging the traction battery 120.

At operation 318, the powertrain is commanded to operate the engine 114 within the target engine speed range. The operation of the powertrain 112 may depend upon a mode of operation of the powertrain 112. For example, in a Park mode, the vehicle 110 may be stationary while the powertrain 112 is on. In the Park mode, the PCU 150 may control the torque converter bypass clutch 134 to be disengaged to decouple the M/G 118 from the gearbox 124. When the engine 114 is running, the PCU 150 may command the disconnect clutch 126 to engage to couple the engine 114 and the M/G 118. The M/G 118 may then rotate at a speed controlled by the engine speed. The engine 114 is operated so that the engine speed is within the target engine speed range.

In a Drive mode of operation, the powertrain 112 may be controlled to maintain the engine speed in the target engine speed range. In the Drive mode of operation, the vehicle 110 may be traveling at a speed according the application of the accelerator pedal 152. The speed of the vehicle 110 may dictate the speed of the transmission output shaft 136. The speed of the M/G 118 may be related to the transmission output speed by the transmission gear ratio. As the transmission has selectable gear ratios, a gear ratio may be selected to operate the M/G 118 within the target engine speed range. The PCU 150 may compute the desired transmission gear and command the transmission 124 to shift to the selected gear. The gear may be such that the engine 114 operates at a higher speed than during normal operation. When the limited operating strategy is engaged, the powertrain may operate noticeably different than during normal operation.

In the Drive mode, the operator may change the vehicle speed using the accelerator pedal 152. As such, the vehicle speed may change during the drive cycle due to driver demand. The PCU 150 may monitor the battery current and engine speed during vehicle operation to maintain the engine speed in the target engine speed range. The PCU 150 may command shifting of the gearbox 124 to maintain the engine speed in the target engine speed range. In some situations, clutch 134 may be disengaged to permit some difference between the M/G speed and the transmission input shaft speed. The PCU 150 may also control operation of accessories 162 to reduce power required when operating in the LOS mode.

Brake applications during the Drive mode may be monitored to adjust powertrain operation. For example, the PCU 150 may receive a signal indicative of a brake pedal position. In a condition where the vehicle is braking, the PCU 150 may control the clutch 134 and the gearbox 124 so that the engine 114 may maintain operation in the target engine speed range. During a brake application or when the vehicle is stopped, the gearbox 124 may be shifted to a neutral gear and the clutch 134 may be disengaged. This allows the engine 114 to be controlled within the target engine speed range.

At operation 320, the traction battery 120 is passively charged using the M/G 118. During charging, the battery current may be monitored to ensure that the LOS mode is operating correctly. For example, the battery current may be monitored to ensure that it remains within the predetermined range. In addition, the state of charge of the traction battery 120 may be monitored. The LOS mode may be terminated when the state of charge exceeds a predetermined upper threshold. The predetermined upper threshold may be greater than the threshold at which the passive charging is initiated to provide some hysteresis. Over the course of the drive cycle, the operations may be repeated as conditions change in order to maintain the state of charge of the traction battery 120 at an acceptable level.

The system described enables a limp-home mode for the hybrid vehicle. The LOS mode described allows the vehicle to travel without using the M/G 118 for propulsion. The benefit is that vehicle may be driven to a safe place in the event of conditions that would previously cause the vehicle to be inoperable. Further, the LOS mode maintains the traction battery 120 at a level that allows subsequent drive cycles. As such, towing of the vehicle may be avoided and the operator may drive the vehicle to a service facility.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an engine and an electric machine coupled to a gearbox; and
   a controller programmed to, for a period of time defined by a state of charge of a traction battery being less than a threshold and responsive to a loss of speed feedback of the electric machine, operate the engine and gearbox to cause current to flow from the electric machine to the traction battery through passive operation of a power inverter.

2. The vehicle of claim 1 wherein the controller is further programmed to, in response to a transition of the gearbox to a park gear during the period of time, disengage a clutch between the gearbox and the electric machine and change a speed of the engine to further cause current to flow from the electric machine to the traction battery.

3. The vehicle of claim 1 wherein operating the engine includes adjusting a speed of the engine such that current flow is less than a predetermined charge current limit.

4. The vehicle of claim 1 wherein operating the engine includes adjusting a speed of the engine based on a voltage of the traction battery.

5. The vehicle of claim 1 wherein operating the engine includes adjusting a speed of the engine based on a charge power capability of the traction battery.

6. The vehicle of claim 1 wherein operating the engine includes adjusting a speed of the engine based on a magnetic strength of the electric machine.

7. The vehicle of claim 1 wherein operating the engine includes adjusting a speed of the engine based on a resistance of the traction battery.

8. The vehicle of the claim 1 wherein the controller is further programmed to operate the engine and gearbox to cause current to flow from the electric machine to the traction battery through passive operation of the power inverter in response to a diagnostic signal from the power inverter that controls the electric machine indicative of a condition that inhibits activation of switching devices in the power inverter.

9. A hybrid powertrain comprising:
   a controller programmed to,
      responsive to losing communication with a power inverter that controls an electric machine coupled to an engine, adjust a speed of the engine to fall within a predetermined range expected to cause a current flowing to a traction battery to exceed a threshold during passive operation of the power inverter, and
      responsive to the current exceeding the threshold, transition the hybrid powertrain to a limited operating mode.

10. The hybrid powertrain of claim 9 wherein the controller is further programmed to, in response to transitioning to the limited operating mode, change a speed of the engine and a gear of a gearbox to cause the electric machine to generate a current to flow into the traction battery while maintaining a driver demanded vehicle speed.

11. The hybrid powertrain of claim 10 wherein the controller is further programmed to, in response to a transition of the gearbox to a park gear, disengage a clutch between the gearbox and the electric machine and adjust the speed of the engine to cause the current to flow from the electric machine to the traction battery.

12. The hybrid powertrain of claim 9 wherein the controller is further programmed to change a gear of an automatic transmission to a selected gear that permits the speed of the engine to be controlled within the predetermined range during a drive cycle.

13. The hybrid powertrain of claim 9 wherein the predetermined range is based on one or more of a voltage of the traction battery, a resistance of the traction battery, a charge power capability of the traction battery, and a magnetic strength of the electric machine.

14. A method comprising:
   changing by a controller an engine speed and a transmission gear during a drive cycle, responsive to a loss of speed feedback of an electric machine and a state of charge of a traction battery being less than a predetermined threshold, such that the engine speed falls within a predetermined range to rotate the electric machine to cause current flow to the traction battery through passive operation of a power inverter.

15. The method of claim 14 further comprising limiting by the controller the engine speed to a predetermined speed to prevent exceeding a charge power capability of the traction battery.

16. The method of claim 14 further comprising adjusting by the controller the engine speed to be within the predetermined range in response to a transition of the transmission gear to a park gear.

17. The method of claim 14 further comprising changing by the controller the engine speed and the transmission gear in response to losing communication with a power inverter that controls the electric machine such that the engine speed falls within the predetermined range.

* * * * *